(12) United States Patent
Stoddard, Jr. et al.

(10) Patent No.: US 8,960,223 B2
(45) Date of Patent: Feb. 24, 2015

(54) PLUG VALVE WITH AN INTERNAL CHECK VALVE

(75) Inventors: Robert Keith Stoddard, Jr., Houston, TX (US); Marius Robert Junier, Houston, TX (US); Lee Ernie Treichel, Richmond, TX (US)

(73) Assignee: Tapco International Corporation, Channelview, TX (US)

( * ) Notice: Subject to any disclaimer, the term of this patent is extended or adjusted under 35 U.S.C. 154(b) by 169 days.

(21) Appl. No.: 13/235,684

(22) Filed: Sep. 19, 2011

(65) Prior Publication Data

US 2012/0073679 A1 Mar. 29, 2012

Related U.S. Application Data

(60) Provisional application No. 61/387,770, filed on Sep. 29, 2010.

(51) Int. Cl.
*F16K 17/12* (2006.01)
*F16K 1/52* (2006.01)
*F16K 1/38* (2006.01)
*F16K 15/06* (2006.01)
*B01J 8/00* (2006.01)
*C10G 11/18* (2006.01)

(52) U.S. Cl.
CPC ... *F16K 1/52* (2013.01); *F16K 1/38* (2013.01); *F16K 15/06* (2013.01); *B01J 8/0015* (2013.01); *B01J 8/002* (2013.01); *B01J 8/008* (2013.01); *B01J 2208/00752* (2013.01); *B01J 2208/00761* (2013.01); *C10G 11/18* (2013.01)
USPC .............. 137/533; 137/533.21; 137/516.27

(58) Field of Classification Search
CPC .................. A47J 27/09; F16K 15/06
USPC .......... 137/533, 516.27, 533.21, 533.31, 543, 137/533.17, 532, 528; 251/284
See application file for complete search history.

(56) References Cited

U.S. PATENT DOCUMENTS 1,072,673 A * 9/1913 Thelen ..................... 137/533.25
2,668,755 A 2/1954 Kershaw et al.
(Continued)

FOREIGN PATENT DOCUMENTS

| DE | 3808176 A1 | 9/1988 |
|---|---|---|
| EP | 0713038 A1 | 5/1996 |
| WO | 89/02048 A1 | 3/1989 |

OTHER PUBLICATIONS

European Search Report dated Jan. 2, 2013 in corresponding patent application EP11183237.4.

*Primary Examiner* — Kevin Lee
*Assistant Examiner* — P. Macade Nichols
(74) *Attorney, Agent, or Firm* — Pearne & Gordon LLP

(57) ABSTRACT

A valve device is provided for controlling air flow. The valve device includes a plug closure member having an interior chamber and a stop device positioned within the interior chamber of the plug closure member. The valve device further includes a check valve having a plate positioned adjacent an inlet opening of the plug closure member and an alignment device attached to the plate and received within a stop opening of the stop device. The check valve is movable between a closed position in which the plate limits passage of a lift air through the interior chamber and an open position in which the plate allows passage of the lift air through the interior chamber. The stop device engages the check valve in the open position.

20 Claims, 5 Drawing Sheets

(56) References Cited

U.S. PATENT DOCUMENTS

| | | | |
|---|---|---|---|
| 2,900,999 A * | 8/1959 | Courtot | 137/516.25 |
| 3,540,472 A * | 11/1970 | Brady et al. | 137/516.29 |
| 4,813,817 A | 3/1989 | Junier | |
| 4,827,967 A | 5/1989 | Junier | |

* cited by examiner

PLUG VALVE WITH AN INTERNAL CHECK VALVE

BACKGROUND OF THE INVENTION

1. Field of the Invention

The invention relates generally to valves and, more particularly, to a plug type control valve for controlling the flow of fluids or fluidized materials through a conduit.

2. Discussion of Prior Art

Fluid catalytic methods and structures are common in the petroleum and chemical industries. In these methods, finely divided catalyst particles are suspended in a gas and maintained in a fluid-like state. To move the catalyst particles from one vessel to another, a stream of air can be provided from a valve device. The valve device can include a hollow tube plug valve with an internal check valve to control the stream of air. The check valve can move within the plug valve between an open position, in which air flow can exit the valve device, and a closed position, in which air flow is prevented from exiting the valve device. However, air flow past the check valve can be turbulent, thus allowing catalyst particles to infiltrate the hollow tube plug valve during normal operation while lift air is flowing. These catalyst particles can cause abnormal wear within the plug valve due to catalyst erosion. Thus, it would be beneficial to modify an existing plug valve to reduce the ingress of catalyst particles into the plug valve.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a valve device for controlling lift air flow comprising a plug closure member having an interior surface defining an interior chamber, the interior chamber including at least one opening oriented along a longitudinal axis of the plug closure member. The valve device further includes a stop device positioned within the interior chamber, the stop device including a stop opening extending in a direction substantially parallel to the longitudinal axis, and a check valve positioned within the interior chamber. The check valve comprises a plate having a plate diameter that is larger than a diameter of the at least one opening and an alignment device attached to the plate and extending coaxially with the stop opening, the alignment device being insertable into the stop opening and movable with respect to the stop opening. The check valve is movable between a closed position in which the plate is configured to limit passage of lift air and an open position in which the plate is configured to allow passage of the lift air.

In accordance with another aspect, the present invention provides a valve device for controlling lift air flow comprising a plug closure member having an interior surface defining an interior chamber, the interior chamber including an inlet opening and an outlet opening oriented along a longitudinal axis of the plug closure member, a stop device attached to the interior surface, the stop device including a plurality of vane plates projecting radially towards the interior surface, wherein adjacent vane plates define a passageway extending between the adjacent vane plates, and a check valve positioned within the interior chamber, the check valve including a plate extending in a direction that is substantially perpendicular to the longitudinal axis of the plug closure member, the plate having a plate diameter that is larger than a diameter of each of the inlet opening and the outlet opening. The check valve is movable between a closed position in which the plate engages the interior surface and is configured to limit passage of lift air past the plate and an open position in which the plate is spaced a distance from the interior surface and is configured to allow passage of the lift air past the plate and through the passageway.

In accordance with another aspect, the present invention provides a valve device for controlling lift air flow comprising a plug closure member having an interior surface defining an interior chamber, the plug closure member including an inlet opening through which lift air enters the plug closure member and an outlet opening positioned downstream from the inlet opening through which lift air exits the plug closure member, a stop device non-movably positioned within the interior chamber, the stop device including a plurality of vane plates projecting radially towards the interior surface, wherein adjacent vane plates define at least one passageway extending between the adjacent vane plates, and a check valve positioned in the interior chamber upstream from the stop device, the check valve including a plate having a plate diameter that is larger than the diameter of the at least one opening, the check valve further including a shoulder positioned downstream from the plate. The check valve is movable between a closed position and an open position, wherein in the closed position, the plate engages the interior surface and is configured to limit passage of lift air past the plate, further wherein in the second position, the shoulder engages the stop device and the plate is spaced a distance from the interior surface such that the lift air is configured to flow past the plate and through the at least one passageway.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
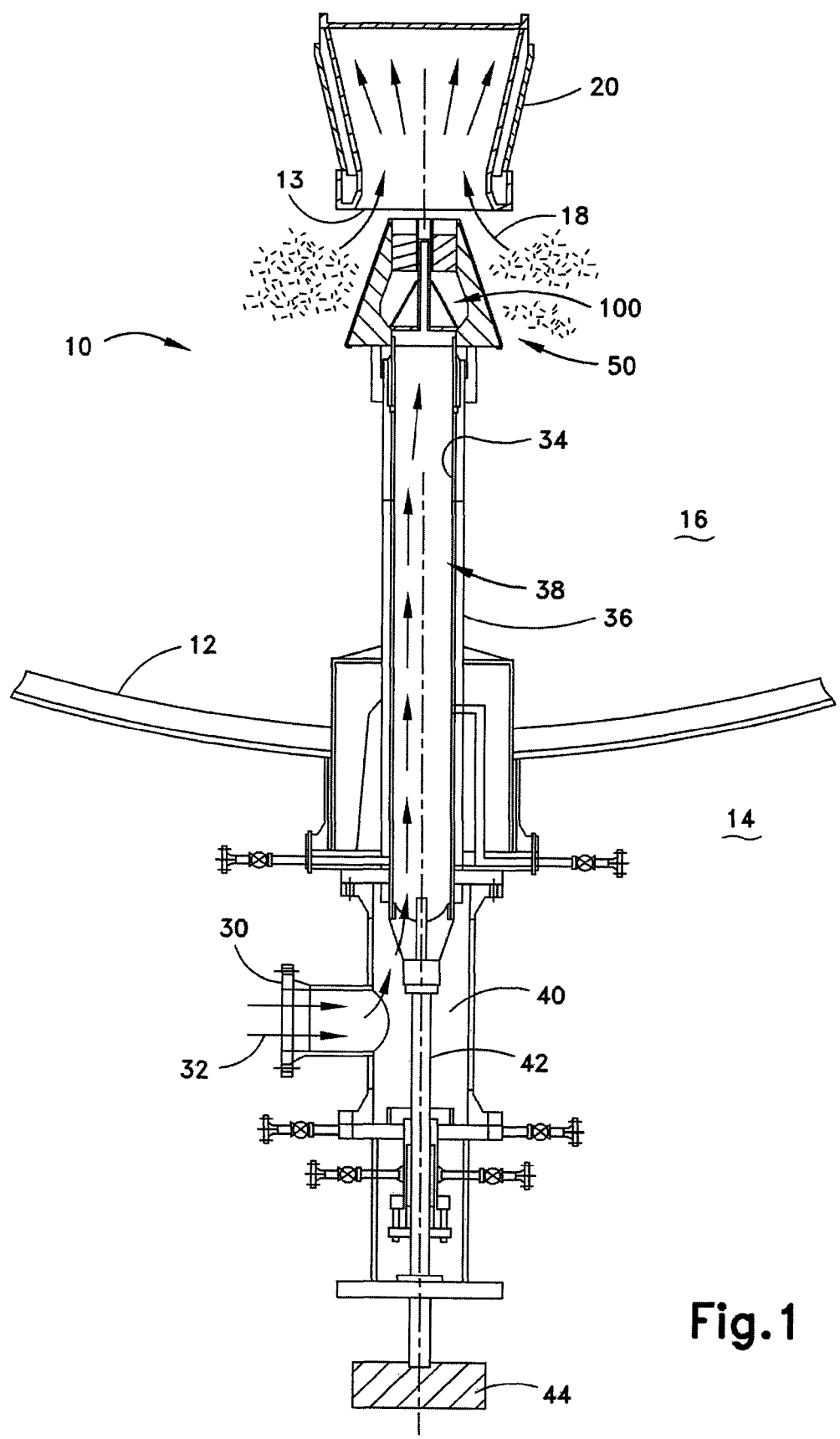
FIG. 1 is a side view of a cross-section of an example valve device in a closed position in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 illustrates an example valve device 10 according to an aspect of the invention. The valve device 10 can be positioned at least partially within a regenerator vessel 12 which contains a catalyst material 18. The valve device 10 can selectively provide lift air 32 through an end of the valve device 10. The force of the lift air exiting the valve device 10 can impel the catalyst material 18 through an opening 13 and into a seat assembly 20. The mixture of the catalyst material 18 and the lift air 32 can pass through the seat assembly 20 and pass an upper vessel (not shown).

The regenerator 12 can store the catalyst material 18 within an interior 16 of the regenerator 12. The catalyst material 18 can be selectively circulated between the regenerator 12 and an upper vessel (not shown), such as a fluid reactor. The regenerator 12 can include an opening through which the valve device 10 can extend into the regenerator 12. The regenerator 12 is only generically shown, and can take on any number of sizes and structures.

Figure 2:
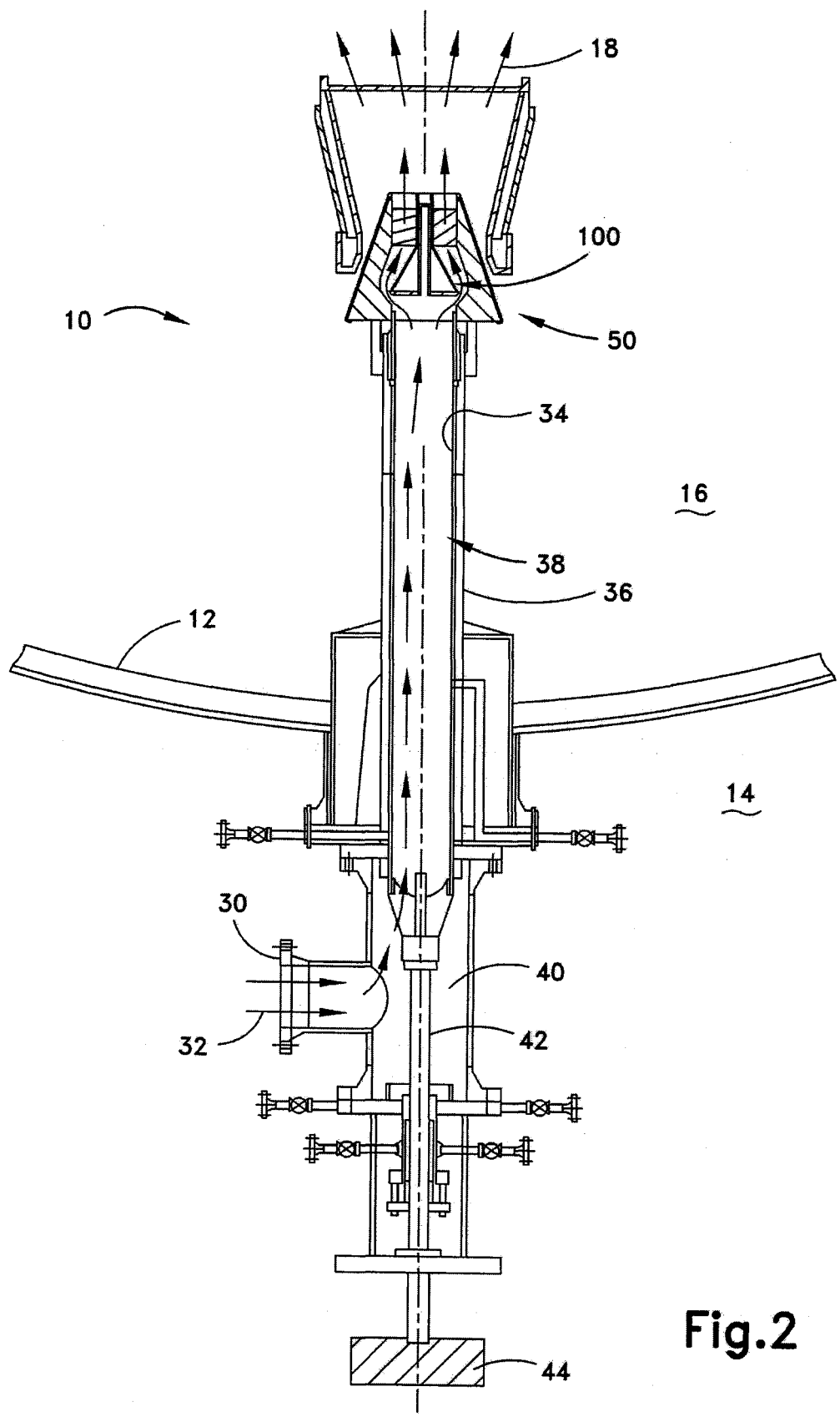
FIG. 2 is a side view of the cross-section of the example valve device in an open position in accordance with an aspect of the present invention.

As shown in FIGS. 1 and 2, the seat assembly 20 can be positioned within the interior 16 of the regenerator 12. The seat assembly 20 can be a cylindrically shaped structure in fluid association with an upper vessel (not shown). The seat assembly 20 can be positioned substantially coaxially with the valve device 10, such that the seat assembly 20 is in alignment with the valve device 10. The seat assembly 20 can include the opening 13 positioned at a bottom portion, such that catalyst material 18 can enter an interior of the seat assembly 20. As such, the seat assembly 20 can receive the catalyst material 18 from the regenerator vessel 12. The catalyst material 18 can pass through the seat assembly 20 to the upper vessel. As shown in FIG. 1, the valve device 10 can be positioned in an open position at a distance away from the seat assembly 20 such that the catalyst material 18 can pass through the opening 13 and into the seat assembly 20. As shown in FIG. 2, the valve device 10 can be positioned in a closed position in engagement with the seat assembly 20, such that catalyst material 18 is limited or prevented from entering the seat assembly 20 through the opening.

Referring now to the valve device 10, the valve device 10 can extend from an exterior 14 to the interior 16 of the regenerator 12. The valve device can include an inlet opening 30 positioned at the exterior 14 of the regenerator vessel 12. The inlet opening 30 is shown positioned at a side of the valve device 10, however, other locations are contemplated. For instance, the inlet opening 30 can be provided at an end of the valve device 10, nearly anywhere along a side, or the like. The inlet opening 30 can be in fluid communication with a fluid delivery source (not shown), such as a blower, compressed air supply, or the like, that delivers fluid to the inlet opening. Specifically, the fluid can include lift air 32 that can be pumped through the inlet opening 30 at a desired pressure. It is to be understood, however that "lift air" is a generic term, and can include nearly any type of gas or fluid, such as compressed air.

The valve device 10 can further include a chamber 40. The chamber 40 can be a substantially hollow structure that is in fluid communication with the inlet opening 30. The chamber 40 can receive lift air 32 from the inlet opening 30. As such, lift air 32 can pass from the inlet opening 30 and through the chamber 40. The chamber 40 could have a larger or smaller diameter than shown in the example, or could be longer or shorter in length.

The valve device 10 can further include a guide tube 36. The guide tube 36 is a substantially hollow structure that extends along a longitudinal axis of the valve device 10. The guide tube 36 is cylindrically shaped, however, a variety of sizes and shapes are contemplated. The guide tube 36 can extend at least partially into the chamber 40 at one end, and into the interior 16 of the regenerator 12 at an opposite end.

The valve device 10 can further include a stem tube 34. The stem tube 34 can be positioned within an internal portion of the guide tube 36. Liner bearings (not shown) can be provided to allow movement of the stem tube 34 with respect to the guide tube 36. The stem tube 34 can include a hollow tube portion 38 extending along a center of the stem tube 34. The hollow tube portion 38 of the stem tube 34 can be provided in fluid communication with the inlet opening 30 and the chamber 40. The hollow tube portion 38 can receive lift air 32 that flows through the inlet opening 30, through the chamber 40, and into the hollow tube portion 38. As such, the hollow tube portion 38 is positioned downstream from the chamber 40, which is positioned downstream from the inlet opening 30.

The valve device 10 can further include a stem 42 and an actuator 44. The stem 42 can include a tube-like structure that extends along an axial length of the chamber 40. The stem 42 can be attached to the stem tube 34 at one end and to an actuator 44 at an opposite end. The actuator 44 is only generically shown, and can take on a number of different structures. The actuator 44 can provide axial movement to the stem 42, such that the stem tube 34 can move axially, such as in an upwards and downwards direction. Specifically, the actuator 44 can cause the stem tube 34 to translate in a direction towards and/or away from the seat assembly 20. The stem tube 34 can move with respect to the guide tube 36, which may remain stationary. Accordingly, a user can selectively trigger the actuator 44 to move the stem tube 34. As shown in FIG. 1, the actuator 44 may move the stem tube 34 backwards (i.e., closer to the actuator 44), such that the valve device 10 is positioned in the open position a distance away from the seat assembly 20. As shown in FIG. 2, the actuator 44 can move the stem tube 34 forwards (i.e., farther from the actuator 44), such that the valve device 10 is positioned in the closed position in engagement with the seat assembly 20.

Figure 3:
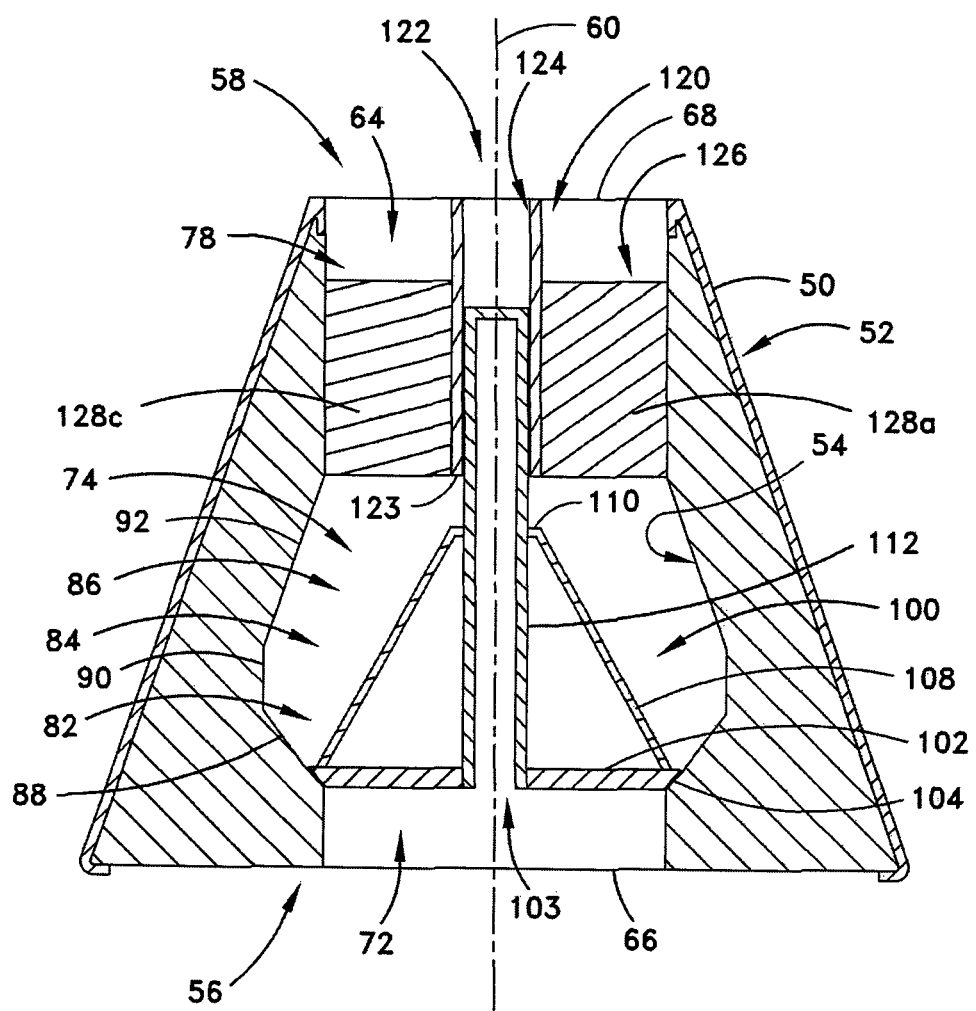
FIG. 3 is a side view of a cross-section of an example check valve in a closed position in accordance with an aspect of the present invention.

Referring now to FIG. 3, the valve device 10 can further include a plug closure member 50. The plug closure member 50 can be positioned within the interior 16 of the regenerator vessel 12. The plug closure member 50 can be attached to an end of the stem tube 34 (shown in FIG. 4) such that the plug closure member 50 is in fluid communication with the hollow tube portion 38 of the stem tube 34. Accordingly, the plug closure member 50 can receive lift air 32 from the stem tube 34.

The plug closure member 50 is shown as a conically shaped structure having an exterior surface 52 and an interior surface 54. The exterior surface 52 is generally tapered along a longitudinal axis 60, such that an inlet end 56 of the plug closure member 50 has a larger diameter than an outlet end 58. While the plug closure member 50 is conically shaped in the shown examples, it is to be understood that a number of sizes and shapes are contemplated. For instance, the plug closure member 50 could be longer or shorter in length, or could have larger or smaller diameters. As such, the examples shown and described herein are not intended to limit the plug closure member 50. The plug closure member 50 can be formed from a number of materials. For instance, the plug closure member 50 could be formed of steel. In further examples, the plug closure member 50 could be formed from a high temperature steel, such as 304H stainless steel, such that the plug closure member 50 can operate in a variety of high temperature environments. It is to be understood, however, that the plug closure member 50 could be formed of a variety of materials, and is not limited to the examples described herein.

The plug closure member 50 can include an inlet opening 66 positioned at the inlet end 56. The inlet opening 66 can be attached to the stem tube 34 such that the inlet opening 66 can be in fluid communication with the hollow tube portion 38 of the stem tube 34 (shown in FIG. 4). The inlet opening 66 can be attached to the stem tube 34 in a number of ways. For instance, briefly referring to FIG. 4, an outer wall diameter of the stem tube 34 can be slightly smaller than an inlet diameter of the inlet opening 66. As such, the stem tube 34 can be received within the inlet opening 66 in a male-female attachment configuration. Further attachment methods and structures, such as adhesives, snap-fit means, mechanical fasteners, or the like may also be provided to assist in attaching the stem tube 34 to the plug closure member 50. Accordingly, lift air 32 can pass from the hollow tube portion 38 of the stem tube 34 and through the inlet opening 66 of the plug closure member 50. In one example, the inlet opening can have an inlet diameter of about 330.2 millimeters (13 inches), however, other diameters are contemplated.

Referring to FIG. 3, the plug closure member 50 can further include an outlet opening 68 positioned at the outlet end 58. The outlet opening 68 can be positioned adjacent and in close proximity to the seat assembly 20 (shown in FIGS. 1 and 2). The outlet opening 68 can be positioned at a downstream outlet end of the plug closure member 50. The outlet opening 68 can have an outlet diameter that can be larger than or the same size as the inlet diameter of the inlet opening 66. For instance, in one example, the outlet opening 68 can have an outlet diameter that is about 339.725 millimeters (13.375 inches). As such, when the outlet opening 68 is larger than the inlet opening 66, lift air 32 passing through the plug closure member 50 can experience a pressure drop from the inlet opening 66 to the outlet opening 68. In one example, the pressure drop can be about 9.38 kilopascals (1.36 pounds/square inch).

The plug closure member 50 can be substantially hollow and include an interior chamber 64. Specifically, the interior surface 54 of the plug closure member 50 defines the interior chamber 64. The interior chamber 64 can extend along the longitudinal axis 60 from the inlet end 56 to the outlet end 58 of the plug closure member 50. The interior chamber 64 can be in fluid communication with the inlet opening 66 and the outlet opening 68. As such, lift air 32 can pass from the inlet opening 66, through the interior chamber 64, and exit through the outlet opening 68. The inlet opening 66 is therefore upstream from the outlet opening 68.

The interior chamber 64 can include a number of sizes and shapes. For instance, in the shown example, the interior chamber 64 can include a plurality of chambers, including a first chamber portion 72, a central portion 74, and a second chamber portion 78. The first chamber portion 72 is positioned adjacent the inlet opening 66. The first chamber portion 72 can have the same diameter as the inlet diameter of the inlet opening 66, though other diameters are contemplated. The first chamber portion 72 can extend a distance from the inlet end 56 into the plug closure member 50, and can be in fluid communication with the hollow tube portion 38 of the stem tube 34. As such, the first chamber portion 72 can receive lift air 32 from the stem tube 34.

The interior chamber 64 can further include the central portion 74. The central portion 74 can have a varying diameter along the longitudinal axis 60 of the plug closure member 50. Specifically, the central portion 74 can have three separately sized chambers: a first central chamber 82, a second central chamber 84, and a third central chamber 86.

The first central chamber 82 can be positioned downstream and in fluid communication with the first chamber portion 72. The first central chamber 82 can have a first central chamber wall 88 that projects radially outward from the longitudinal axis 60 along an axial length of the plug closure member 50. As such, the first central chamber 82 can have an increasing diameter along the longitudinal axis 60 such that the first central chamber 82 has a flared. At an upstream location, the first central chamber 82 can have the same diameter as the first chamber portion 72, before projecting outwardly and enlarging in diameter. The first central chamber 82 can include a truncated cone shape, such as an inverted cone shape, though other shapes are contemplated as well.

The central portion 74 of the interior chamber 64 further includes the second central chamber 84. The second central chamber 84 can be downstream and in fluid communication with the first central chamber 82. Specifically, an upstream location of the second central chamber 84 is positioned adjacent a downstream location of the first central chamber 82. The second central chamber 84 is bounded by a second central chamber wall 90. The second central chamber wall 90 can extend axially at a substantially constant distance from the longitudinal axis 60, such that the second central chamber 84 has a cylindrical shape with a substantially constant diameter. The diameter of the second central chamber 84 can be a maximum diameter within the plug closure member 50 and may be larger than the diameters of each of the inlet opening 66 and the outlet opening 68. It is to be understood, however, that further shapes are contemplated and the second central chamber 84 is not limited to the size and shape in the shown example. For instance, the second central chamber 84 may have a conical shape, similar to the first central chamber 82 and/or could have a varying diameter along the longitudinal axis 60.

The central portion 74 of the interior chamber 64 further includes the third central chamber 86. The third central chamber 86 can be downstream and in fluid communication with the second central chamber 84. Specifically, an upstream location of the third central chamber 86 is positioned adjacent a downstream location of the second central chamber 84. The third central chamber 86 can have a third central chamber wall 92 that projects radially inward towards the longitudinal axis 60 along an axial length of the plug closure member 50. As such, the third central chamber 86 can have a decreasing diameter (i.e., tapered) along the longitudinal axis 60. The third central chamber 86 can be in fluid communication with the second central chamber 84. Specifically, at an upstream location, the third central chamber 86 can have the same diameter as the second central chamber 84, before projecting inwardly and decreasing in diameter. The third central chamber 86 can include a truncated cone shape, though other shapes are contemplated as well.

The interior chamber 64 further includes the second chamber portion 78. The second chamber portion 78 is positioned within the interior chamber 64, specifically downstream from the third central chamber 86 and upstream from the outlet opening 68. The second chamber portion 78 can have substantially the same diameter as a downstream diameter of the third central chamber 86. The second chamber portion 78 can have a cylindrical shape and may be bounded by the interior surface 54. For instance, the interior surface 54 can extend axially at a substantially constant distance from the longitudinal axis 60, such that the second chamber portion 78 has a cylindrical shape with a substantially constant diameter. It is to be understood, however, that further shapes are contemplated and the second chamber portion 78 is not limited to the size and shape shown here.

Referring still to FIG. 3, the valve device 10 can further include a check valve 100. The check valve 100 can be positioned at least partially in the central portion 74 of the interior chamber 64 of the plug closure member 50. The check valve 100 can include a plate 102 positioned substantially perpendicular to the longitudinal axis 60 of the plug closure member 50. The plate 102 can extend along a substantially planar surface and can have a circular shape. The plate 102 can have a plate diameter that is larger than the inlet diameter of the first chamber portion 72 and the outlet diameter of the second chamber portion 78. Specifically, the plate 102 can be slightly larger in diameter than the first chamber portion 72, such that the plate 102 is prevented from exiting through the inlet opening 66. The plate 102 can have a plate diameter that is less than the diameter of the second central chamber 84. As such, the plate 102 will contact the first central chamber wall 88 when in contact with the first central chamber 82. In addition, the plate diameter can be larger than a diameter of the third central chamber 86 such that the plate 102 is prevented from being removed through the outlet opening 68. Accordingly, the plate 102 and check valve 100 can be non-removably held within the interior chamber 64 of the plug closure member 50.

In the shown examples, the plate 102 can include an opening 103 at a center portion of the plate 102. However, it is to be understood that the plate may be provided without an opening, such that the plate 102 is substantially solid without any holes, openings, or the like. The plate 102 can be made of a similar material as the plug closure member 50, such as stainless steel, or, in the alternative, could be made of a different material. The plate 102 can have a number of different thicknesses, such as, for example, about 19.05 millimeters (0.75 inches).

Figure 4:
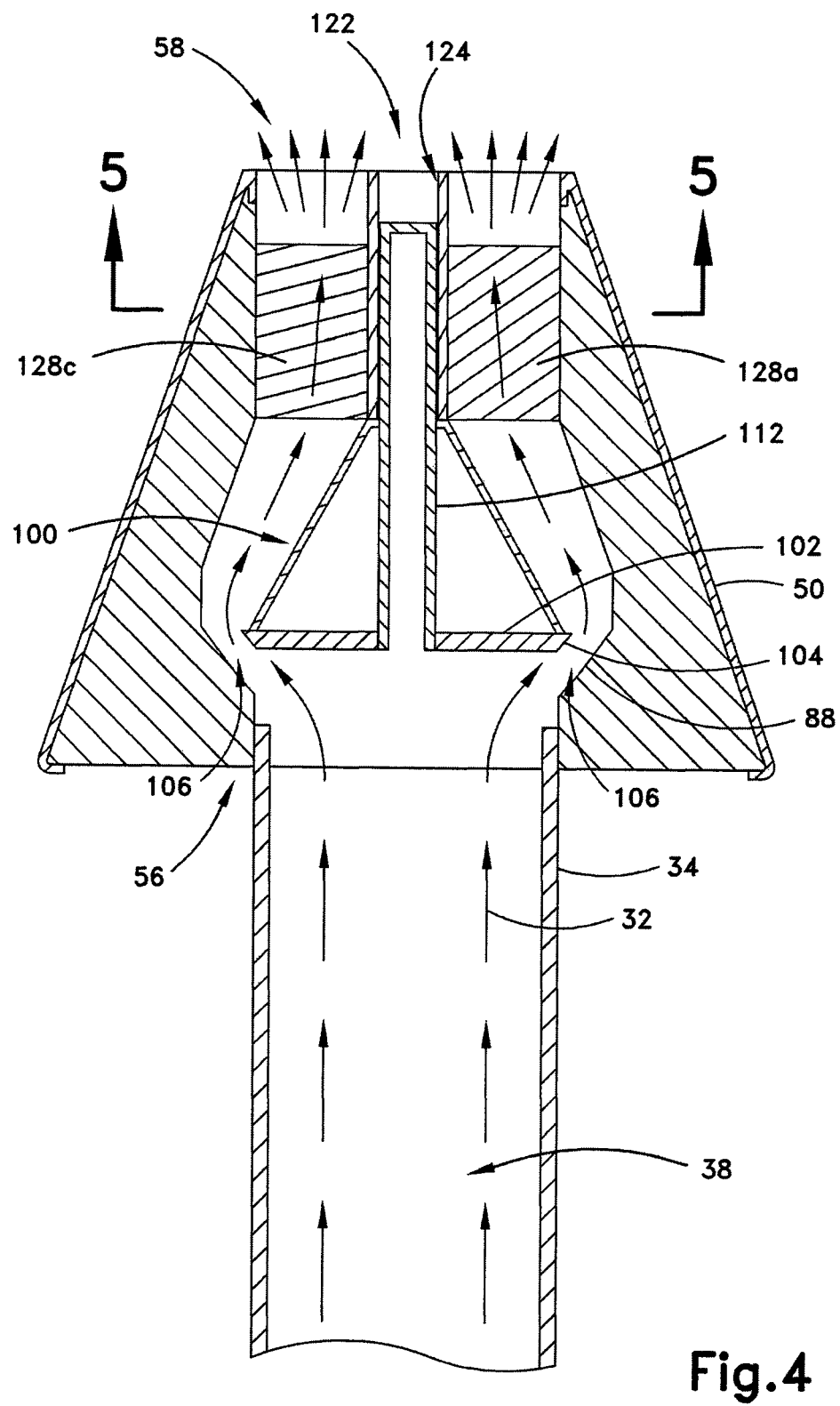
FIG. 4 is a side view of the cross-section of the example check valve in an open position in accordance with an aspect of the present invention.

Referring briefly to FIG. 4, the plate 102 can further include a valve seat 104. The valve seat 104 can be formed at an outer periphery of the plate 102. The valve seat 104 can be angled such that the valve seat substantially matches the shape of the first central chamber wall 88. Specifically, the valve seat 104 can have a downwardly facing chamfer or taper. Accordingly, when the plate 102 engages and makes contact with the first central chamber wall 88, the valve seat 104 can be substantially flush with the first central chamber wall 88 to form a seal. As will be described below, the plate 102 can be moved between contacting the first central chamber wall 88 (shown in FIG. 3) and being spaced apart from the first central chamber wall 88 (shown in FIG. 4). When the plate 102 is spaced from the first central chamber wall 88, the plate 102 and the first central chamber wall 88 can define a valve seat opening 106 extending therebetween. Lift air 32 can pass through the valve seat opening 106. Accordingly, the plate 102 can selectively prevent flow of lift air 32 through the plug closure member 50 when the plate 102 is in contact with the first central chamber wall 88.

Referring to FIG. 3, the check valve 100 can further include a support section 108. The support section 108 can have a truncated conical shape. The support section 108 can be attached to the plate 102 at a side opposite from the first chamber portion 72. The support section 108 can be attached in any number of ways to the plate 102, including welding, adhesives, fasteners, brazing, or the like. As such, the support section 108 can be positioned at least partially within the central portion 74 of the interior chamber 64. The support section 108 can be attached to an outer periphery of the plate 102 and can be tapered along the longitudinal axis 60 in a direction away from the plate 102. As such, the support section 108 can have a maximum diameter at the plate 102 and can have a gradually reducing diameter in a direction away from the plate. The support section 108 can include a number of different sizes and materials. For instance, in one example, the plate forming the support section 108 can have a 9.525 millimeter (3/8" inches) thickness.

The support section 108 can include a shoulder 110. The shoulder 110 can be positioned at an end of the support section 108 that is opposite from the plate 102. The shoulder 110 can project radially inward from the support section 108 such that the shoulder 110 extends along a direction that is substantially perpendicular to the longitudinal axis 60. As will be described in more detail below, the shoulder 110 can assist in limiting maximum movement of the check valve 100. The shoulder 110 can be formed as part of the support section 108, such as by bending an end of the support section 108. In another example, the shoulder 110 can be attached to the support section 108 as a separate structure, such as by welding, mechanical fasteners, adhesives, or the like.

The check valve 100 can further include an alignment device 112. The alignment device 112 can be attached to the plate 102 at a side opposite from the first chamber portion 72. The alignment device 112 can be attached to the plate 102 in any number of ways, including welding, adhesives, fasteners, brazing, or the like. As such, the alignment device 112 can be positioned within the central portion 74 of the interior chamber 64. The alignment device 112 can be substantially cylindrical in shape, as in the shown example, though other shapes are contemplated. For instance, the alignment device 112 can have a square shaped cross-section, triangular shaped cross-section, or the like. As such, the alignment device 112 in the shown example is not intended to limit further possible shapes. Further, the alignment device 112 can be formed from a pipe, tube, or the like. In one example, the alignment device 112 can be formed from a pipe having dimensions of 2" schedule 80, though other sizes, shapes, and measurements are contemplated.

The alignment device 112 can extend from the plate 102 towards the outlet end 58 of the plug closure member 50. The alignment device 112 can extend through the support section 108 and through the shoulder 110. As shown, the alignment device 112 can be attached to the shoulder 110, such that the shoulder 110 abuts an outer surface of the alignment device 112 and substantially surrounds the alignment device 112. The alignment device 112 can extend along the longitudinal axis 60 and can extend substantially coaxially with either or both of the plug closure member 50 and check valve 100. It is to be understood, however, that the alignment device 112 need not be centered along the longitudinal axis 60. In further examples, the alignment device 112 could be off-centered from the longitudinal axis 60. Even further, the alignment device 112 could comprise a plurality of alignment devices, such as more than one tube-like structure.

Movement of the alignment device 112 can cause movement of both the plate 102 and the support section 108. Due to the attachment of the alignment device 112 to both the plate 102 and the support section 108, when the alignment device 112 moves, such as upwards or downwards along the longitudinal axis 60, the plate 102, support section 108, and shoulder 110 can simultaneously move as well.

The valve device 10 can further include a stop device 120. The stop device 120 can be positioned partially or completely within the second chamber portion 78. As shown, the stop device 120 is positioned completely within the second chamber portion 78 with a lowermost portion of the stop device 120 positioned adjacent the third central chamber 86 of the central portion 74. It is to be understood, however, that the stop device 120 could be positioned lower, such that the lowermost portion of the stop device 120 is positioned within the third central chamber 86. The stop device 120 can be attached to the interior surface 54 of the plug closure member 50 such that the stop device 120 is non-movably positioned within the plug closure member 50.

The stop device 120 can include a stop opening 122 for receiving the alignment device 112. The stop opening 122 can be shaped as a cylindrical bore having a stop opening wall 124. The stop opening 122 can have a stop opening diameter that is slightly larger than the diameter of the outer surface of the alignment device 112. The stop opening 122 is not limited to the size and shape shown and, instead, can be sized and shaped to match the alignment device 112. For instance, if the alignment device 112 has a square shaped cross-section, then the stop opening 122 could also have a square shape that is slightly larger than the alignment device 112. In the shown example, the stop opening 122 can extend towards the outlet end 58 so as to be substantially flush with the end of the plug closure member 50. However, the stop opening 122 could be shorter in length than the shown examples. For instance, the stop opening 122 could extend only partially towards the outlet end 58, such that the stop opening 122 is half of the length shown or ⅔ of the length shown.

The stop opening 122 is positioned along substantially the same longitudinal axis as the alignment device 112. As such, the stop opening 122 can receive the alignment device 112 with minimal friction between the stop opening wall 124 and the outer surface of the alignment device 112. In further examples, the stop opening 122 can be positioned to match the location and orientation of the alignment device 112. For instance, if the alignment device 112 is off-centered from the longitudinal axis 60, the stop opening 122 can similarly be offset so as to receive the alignment device 112. As such, the stop opening 122 is designed to receive the alignment device 112 while simultaneously allowing the alignment device 112 to move with respect to the stop opening 122. The stop opening 122 can prevent radial movement (i.e., side to side movement) of the alignment device 112 and, thus, the check valve 100. As such, the engagement between the stop opening 122 and alignment device 112 ensures that the check valve 100 moves substantially along the longitudinal axis in an upwards and downwards direction with limited side to side movement.

It is to be understood that in further examples, the positions of the alignment device 112 and the stop opening 122 could be reversed. For instance, the stop device 120 could include an alignment device while the check valve 100 could include a stop opening. In such an example, the functions of the alignment device and stop opening are the same as in the example shown in FIG. 3.

The stop opening 122 can further include a stop seat 123. The stop seat 123 can be positioned at a bottom surface of the stop opening 122. Specifically, the stop seat 123 can be formed as the bottom surface of the stop opening wall 124. The stop seat 123 can define a substantially planar surface that is circular with the longitudinal axis as the center point. The stop seat 123 can extend in a direction that is substantially perpendicular to the longitudinal axis 60. The stop seat 123 can be positioned to engage the shoulder 110 of the check valve 100. As shown in FIG. 4, when the check valve 100 is moved into the open position, the stop seat 123 can engage the shoulder 110 by directly contacting the shoulder 110. The stop seat 123 can prevent further movement by the check valve 100 in a direction towards the outlet end 58.

The stop device 120 can further include a vane device 126. The vane device 126 can be positioned around the stop opening 122 and the stop opening wall 124. The vane device 126 can include a plurality of vane plates 128a-d. The vane plates 128a-d can be attached to the stop opening wall 124 and can project outwardly (i.e., radially outward) from the stop opening wall 124. The vane plates 128a-d can extend partially or completely from the stop opening wall 124 to the interior surface 54 of the plug closure member 50. The vane plates 128a-d can either closely abut the interior surface 54 or, in the alternative, could be attached to the interior surface 54, such as by welding, adhesives, or the like. In further examples, the vane plates 128a-d may not extend completely to the interior surface 54, such that a gap may exist between the interior surface and an outward end of the vane plates 128a-d.

Figure 5:
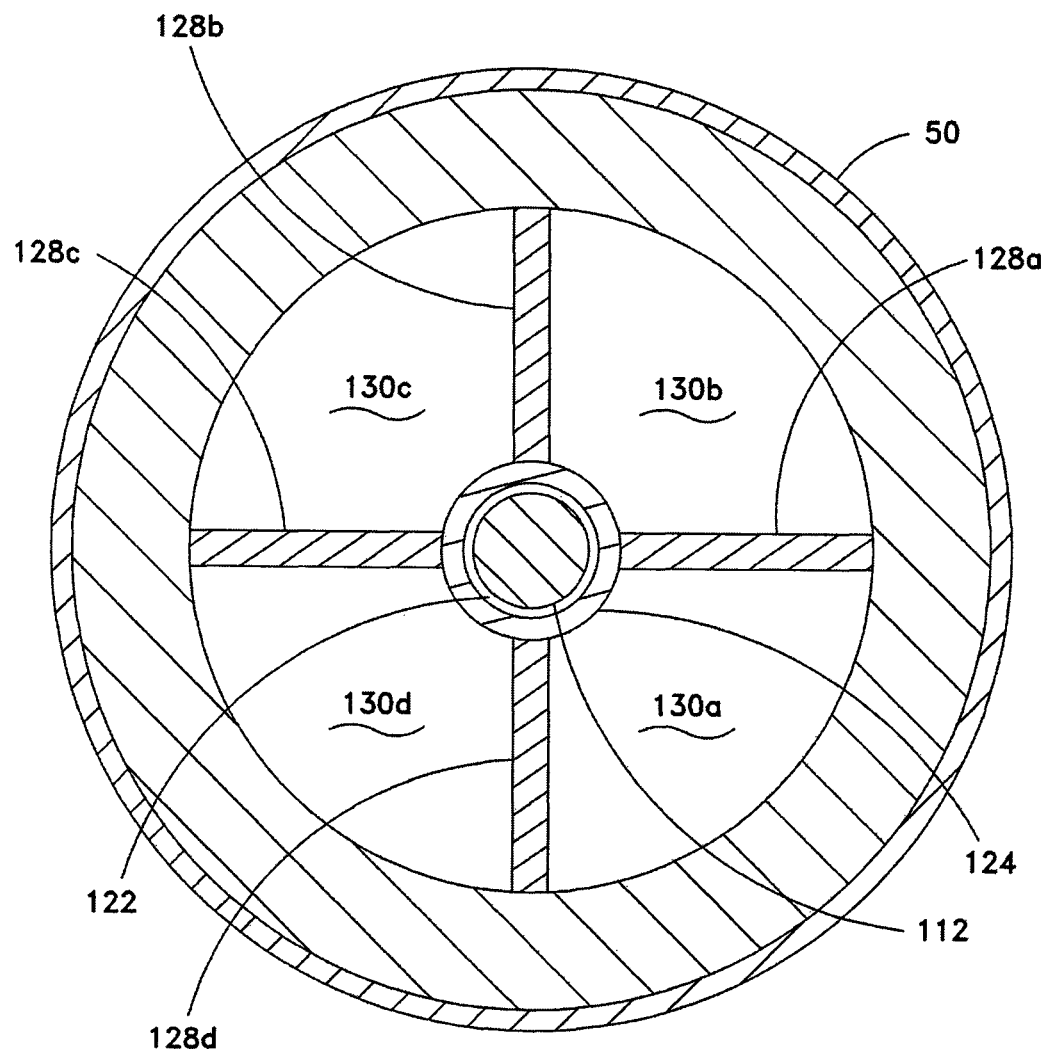
FIG. 5 is a sectional view of an example stop device along line 5-5 of FIG. 4.

Referring to FIG. 5, a top view of the vane device 126 is shown. The vane plates 128a-d can be spaced roughly 90° apart about the longitudinal axis 60. Specifically, the vane plates 128a-d can be spaced slightly less or slightly more than 90° apart about the stop opening 122, such that the vane plates 128a-d are substantially 90° apart. The vane plates 128a-d generally bound four quadrants, shown as passageways 130a-d, with a center or zero point located on the longitudinal axis 60. Each of the four passageways is surrounded by two adjacent neighboring vane plates and the interior surface 54. For example, the passageway 130a is surrounded by the neighboring vane plates 128a, 128d and the interior surface 54. As such, each of the passageways 130a-d can define an opening through the plug closure member 50 extending from the central portion 74 of the interior chamber 64 at an upstream location to the second chamber portion 78 at a downstream location. The vane plates 128a-d are shown to extend only partially through the second chamber portion 78. More specifically, the vane plates 128a-d can extend along a majority of the axial length of the second chamber portion 78. However, in further examples, some or all of the vane plates 128a-d could extend closer to the outlet end 58. Still further, some or all of the vane plates 128a-d could extend along the entire axial length of the second chamber portion 78. In this example, the vane plates 128a-d can extend completely to the outlet end 58 such that the downstream end of the vane plates 128a-d is substantially flush with the outlet end 58 of the plug closure member 50.

The vane plates 128a-d are each substantially planar and can extend in an axial direction that is substantially parallel to the longitudinal axis 60 of the plug closure member 50. The vane plates 128a-d function by straightening the lift air 32 that flows through the passageways 130a-d. By straightening the lift air 32, the vane plates 128a-d can reduce and/or eliminate air turbulence through the second chamber portion 78. In reducing the turbulence, the vane plates 128-d can allow the lift air 32 to exit the outlet opening 68 in a more uniform manner (i.e., substantially constant flow rate across the outlet opening 68). As such, the catalyst material 18 can be reduced and/or prevented from entering the plug closure member 50 at edges of the outlet opening 68.

The operation of the valve device 10 can now be described. Referring to FIG. 1, the valve device 10 can be oriented in an upright position, such that the valve device 10 extends substantially vertically. The valve device 10 in the shown example is in the open position and is not engaged with the seat assembly 20. As such, the plug closure member 50 is positioned a distance apart from the seat assembly 20 and a catalyst material 18 can enter the seat assembly 20 through the opening 13. Lift air can be pumped through the inlet opening 30 and can pass through the chamber 40 and stem tube 34. The check valve 100 can be selectively opened to allow the lift air 32 to pass through and exit the plug closure member 50. The force of the lift air 32 can impel the catalyst material 18 into the seat assembly 20. As shown in FIG. 2, when it is desired to cut off the flow of catalyst material 18 through the opening 13, the actuator 44 can be activated to move the stem 42 and stem tube 34 upwardly and towards the seat assembly 20. The plug closure member 50 can engage the seat assembly to reduce or prevent the flow of catalyst material 18.

Referring now to FIG. 3, the check valve 100 can be selectively opened or closed to allow or prevent the flow of lift air 32 through the plug closure member 50. First, in the closed position, the check valve 100 can limit and/or completely prevent any lift air 32 from passing through the plug closure member 50 and exiting at the outlet end 58. The check valve 100 is biased to the closed position under the influence of gravity. As such, it is the force of the lift air 32 delivered and moving past the check valve 100 that moves the check valve 100 upward along the longitudinal axis 60. If the force of the lift air 32 is insufficient to overcome the force of gravity acting on the check valve 100, then the check valve 100 will remain in the closed position shown in FIG. 3. In the closed position, the plate 102 will engage the first central chamber wall 88. Specifically, the valve seat 104 of the plate will contact the first central chamber wall 88 and reduce any lift air 32 through the plug closure member 50.

Referring now to FIG. 4, the check valve 100 can be moved to the open position. In order to move to the open position, the force of the lift air 32 must be large enough to overcome the force of gravity acting on the check valve 100. The force of the lift air 32 can cause the check valve 100 to translate in an upward direction along the longitudinal axis 60. As the check valve 100 moves upwards, the alignment device 112 can translate further into the stop opening 122. At a maximum upwards position, the shoulder 110 can engage the stop seat 123. This contact between the shoulder 110 and the stop seat 123 can prevent any further upward translation of the check valve 100.

In the open position, the valve seat opening 106 is formed between the valve seat 104 and the first central chamber wall 88. The lift air 32 can pass through the valve seat opening 106 and through the interior chamber 64 of the plug closure member 50. As the lift air 32 exits the central portion 74, the lift air can pass through the vane device 126. As shown in FIG. 5, the lift air 32 can pass through the passageways 130a-d. Each of the passageways 130a-d can have a substantially equal flow rate of lift air 32 passing through. As such, the lift air 32 exiting the outlet end 58 will have a substantially 360° airflow about the longitudinal axis 60. Accordingly, catalyst material 18 located near the outlet end 58 will be prevented from entering the plug closure member 50 through the outlet end 58 when lift air 32 is exiting the plug closure member 50. Further, when the lift air 32 is not passing through the plug closure member 50, the check valve 100 can be in the closed position (shown in FIG. 3). As such, catalyst material 18 that enters the plug closure member 50 through the outlet opening 68 will be prevented from passing through the interior chamber 64 to the stem tube 34 due to the engagement between the valve seat 104 and the first central chamber wall 88.

The effects of the above-described features of the valve device 10 were examined and can now be explained. Tests were conducted related to an example of the valve device 10. In one example, a plug closure member 50 was provided having an inlet diameter of the first chamber portion 72 of about 330.2 millimeters (13 inches) and an outlet diameter of a second chamber portion 78 of about 339.725 millimeters (13.375 inches). A stop opening diameter of the stop opening 122 was about 82.55 millimeters (3.25 inches) and a maximum diameter of the second central chamber 84 was about 501.65 millimeters (19.75 inches). The check valve 100 can move a maximum of about 71.44 millimeters (2.8125 inches) along the longitudinal axis 60 with an inlet area of the check valve 100 being roughly 0.058 square meters (90 square inches) and an exit area (cross-sectional area at the outlet opening 68 minus the area of the stop opening 122) of about 0.085 square meters (132 square inches). Further, in this example, a housing area of the check valve 100 at the second central chamber 84 is about 0.098 square meters (152 square inches).

Lift air 32 was provided to the valve device 10 having approximately these dimensions. The lift air 32 had a flow rate of about 44,588 kg/hour (98,300 pounds/hr) with a molecular weight of the lift air 32 of about 459.1 kg/cubic meter (28.66 pounds/cubic foot). An inlet pressure was recorded at the first chamber portion 72 of about 261.3 kilopascal (37.9 PSIG) with an inlet temperature at that location of about 176.67° C. (350° F.). An inlet pressure drop was calculated from the bottom to the top of the check valve 100, specifically from the plate 102 to the shoulder 110, of about 9.38 kilopascals (1.36 pounds/square inch). An exit pressure drop was calculated from the top of the check valve 100 to the outlet opening 68 of the plug closure member 50 (i.e., exit of the plug closure member 50) of about 4.4 kilopascals (0.64 pounds/square inch).

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A valve device for controlling lift air flow comprising:
   a plug closure member having an interior surface defining an interior chamber, the interior chamber including at least one opening oriented along a longitudinal axis of the plug closure member;
   a stop device positioned within the interior chamber, the stop device including a stop opening extending in a direction substantially parallel to the longitudinal axis; and
   a check valve positioned within the interior chamber comprising:
      a plate having a plate diameter that is larger than a diameter of the at least one opening; and
      an alignment device attached to the plate and extending coaxially with the stop opening, the alignment device being insertable into the stop opening and movable with respect to the stop opening;
   wherein the check valve is movable between a closed position in which the plate is configured to limit passage of lift air and an open position in which the plate is configured to allow passage of the lift air,
   the stop opening has a constant cross-section along the longitudinal axis such that the check valve is movable along the longitudinal axis with limited side to side movement of the check valve relative to the longitudinal axis when moving between the closed position and the open position, and
   at the open position the check valve is unconstrained upstream of the plate in an axial direction relative to the longitudinal axis and a radial direction relative to the longitudinal axis.

2. The valve device of claim 1, wherein the check valve is biased towards the closed position under the influence of gravity, further wherein the check valve is configured to engage the interior surface in the closed position, and the check valve being spaced a distance from the interior surface in the open position.

3. The valve device of claim 2, wherein the stop device includes at least one vane plate extending radially from the stop opening towards the interior surface of the plug closure member.

4. The valve device of claim 3, wherein the at least one vane plate includes four vane plates positioned around the stop opening, further wherein each of the four vane plates is spaced apart about 90° from a neighboring vane plate about the stop opening.

5. The valve device of claim 4, wherein the four vane plates define four passageways extending between the vane plates, each of the four passageways extending along the direction that is substantially parallel to the longitudinal axis from a central portion of the interior chamber to an outlet opening of the interior chamber.

6. The valve device of claim 5, wherein each of the four passageways is configured to straighten the lift air flowing through the stop device and reduce air turbulence.

7. The valve device of claim 3, wherein neighboring vane plates define a passageway extending between the neighboring vane plates in a direction that is substantially parallel to the longitudinal axis.

8. The valve device of claim 3, wherein the check valve further includes a shoulder extending in a direction that is substantially perpendicular to the longitudinal axis.

9. The valve device of claim 8, wherein in the open position, the shoulder is configured to engage the stop device and prevent further movement of the check valve in a direction towards the stop device.

10. The valve device of claim 1, wherein the interior chamber comprises a chamber portion having an inverted cone shape and the plate comprises a valve seat surface that is angled to substantially match the inverted cone shape of the chamber portion such that when the plate engages and makes contact with the chamber portion, the valve seat surface is substantially flush with the chamber portion to form a seal therebetween.

11. A valve device for controlling lift air flow comprising:
a plug closure member having an interior surface defining an interior chamber, the interior chamber including an inlet opening and an outlet opening oriented along a longitudinal axis of the plug closure member;
a stop device attached to the interior surface, the stop device including a plurality of vane plates projecting radially towards the interior surface, wherein adjacent vane plates define a passageway extending between the adjacent vane plates, and the stop device further including a stop opening extending in a direction substantially parallel to the longitudinal axis; and
a check valve positioned within the interior chamber, the check valve including a plate extending in a direction that is substantially perpendicular to the longitudinal axis of the plug closure member, the plate having a plate diameter that is larger than a diameter of each of the inlet opening and the outlet opening, and the check valve further including an alignment device attached to the plate and extending coaxially with the stop opening, the alignment device being insertable into the stop opening and movable with respect to the stop opening;
wherein the check valve is movable between a closed position in which the plate engages the interior surface and is configured to limit passage of lift air past the plate and an open position in which the plate is spaced a distance from the interior surface and is configured to allow passage of the lift air past the plate and through the passageway,
the stop opening has a constant cross-section along the longitudinal axis such that the check valve is movable along the longitudinal axis with limited side to side movement of the check valve relative to the longitudinal axis when moving between the closed position and the open position, and
at the open position the check valve is unconstrained upstream of the plate in an axial direction relative to the longitudinal axis and a radial direction relative to the longitudinal axis.

12. The valve device of claim 11, wherein a cross-sectional dimension of the stop opening is smaller than a diameter of each of the inlet opening and the outlet opening.

13. The valve device of claim 12, wherein the stop opening extends from a central portion of the interior chamber to the outlet opening.

14. The valve device of claim 11, wherein the check valve further includes a shoulder extending in a direction that is substantially perpendicular to the longitudinal axis, the shoulder being configured to engage the stop device when the check valve is in the open position.

15. The valve device of claim 11, wherein each of the plurality of vane plates comprise planar surfaces that are substantially vertical and parallel with the longitudinal axis of the plug closure member.

16. A valve device for controlling lift air flow comprising:
a plug closure member having an interior surface defining an interior chamber, the plug closure member including an inlet opening through which lift air enters the plug closure member and an outlet opening positioned downstream from the inlet opening through which lift air exits the plug closure member;
a stop device non-movably positioned within the interior chamber, the stop device including a plurality of vane plates projecting radially towards the interior surface, wherein adjacent vane plates define at least one passageway extending between the adjacent vane plates, and the stop device further including a stop opening extending in a direction substantially parallel to the longitudinal axis; and
a check valve positioned in the interior chamber upstream from the stop device, the check valve including a plate having a plate diameter that is larger than the diameter of the at least one opening, the check valve further including a shoulder positioned downstream from the plate and an alignment device attached to the plate and extending coaxially with the stop opening, the alignment device being insertable into the stop opening and movable with respect to the stop opening;
wherein the check valve is movable between a closed position and an open position,
in the closed position, the plate engages the interior surface and is configured to limit passage of lift air past the plate,
in the open position, the shoulder engages the stop device and the plate is spaced a distance from the interior surface such that the lift air is configured to flow past the plate and through the at least one passageway,
the stop opening has a constant cross-section along the longitudinal axis such that the check valve is movable along the longitudinal axis with limited side to side movement of the check valve relative to the longitudinal axis when moving between the closed position and the open position, and
at the open position the check valve is unconstrained upstream of the plate in an axial direction relative to the longitudinal axis and a radial direction relative to the longitudinal axis.

17. The valve device of claim 16, wherein a cross-sectional dimension of the stop opening is smaller than a diameter of each of the inlet opening and the outlet opening.

18. The valve device of claim 17, wherein each of the plurality of vane plates are attached to an outer surface of the stop opening at an inner end and are attached to the interior surface of the interior chamber at an outer end.

19. The valve device of claim 17, the check valve further includes a support section attached to the plate, the support section including a truncated conical shape.

20. The valve device of claim 19, wherein the shoulder is positioned at an end of the support section that is opposite from the plate.

* * * * *